United States Patent [19]

Miller et al.

[11] 4,039,454

[45] Aug. 2, 1977

[54] FLUID SEPARATION DEVICE FOR LOW TEMPERATURE ENVIRONMENTS

[75] Inventors: Henry Francis Miller, San Jose; Michael George Hoard, Sunnyvale, both of Calif.

[73] Assignee: Lockheed Aircraft Corporation, Burbank, Calif.

[21] Appl. No.: 700,831

[22] Filed: June 29, 1976

[51] Int. Cl.² ............................................. E02B 15/04
[52] U.S. Cl. ......................... 210/242 S; 210/DIG. 25
[58] Field of Search .................. 210/83, 242, DIG. 25

[56] References Cited

U.S. PATENT DOCUMENTS

| | | | |
|---|---|---|---|
| 3,539,048 | 11/1970 | Pearson | 210/242 |
| 3,576,257 | 4/1971 | Yates | 210/DIG. 25 |
| 3,731,813 | 5/1973 | Tipton | 210/242 |
| 3,804,251 | 4/1974 | Farrell et al. | 210/242 |
| 3,928,206 | 12/1975 | Waren | 210/242 |
| 3,959,136 | 5/1976 | Ayers et al. | 210/DIG. 25 |
| 3,968,041 | 7/1976 | DeYoss | 210/242 |

Primary Examiner—Theodore A. Granger
Attorney, Agent, or Firm—Rodger N. Alleman

[57] ABSTRACT

A device for separating, in an ice environment, fluids having differing physical properties which combine an oleophilic pick-up device with a rotating tumbler mechanism which tends to agitate and propel oil coated pieces of ice rearward and along a perforated inclined through-put barrier where oil jarred off the ice chunks is allowed to rise through the perforations and be contained in an area where it can be accumulated and recovered by the pick-up unit.

5 Claims, 2 Drawing Figures

FLUID SEPARATION DEVICE FOR LOW TEMPERATURE ENVIRONMENTS

BACKGROUND OF THE INVENTION

The invention herein described is designed to enhance the operation of oil pick-up devices which are called upon to operate in freezing temperature environments in which pieces of ice as well as fluid surface areas are found to be coated with undesirable fluids such as oil or the like. The invention is designed to enhance and operate in combination with a Fluid Separation Device of the type described in Yates U.S. Pat. No. 3,576,257, wherein a drum-like member is described which provides a means to pick up oil or other immiscible liquids from a fluid environment. The device described in U.S. Pat. No. 3,576,257 operates by utilizing an inherent characteristic of oil to selectively adhere to an oleophilic surface rotated through the oil while picking up a relatively negligible amount of water or other substance from which the oil is desired to be removed.

While the invention operates most desirably in concert with a Yates type recovery device, it should be understood that it has similar utility in connection with other oil pick-up devices, inter alia those described in U.S. Pat. No. 3,702,297, "Oil Skimming Device and Method" and 3,865,730 "Oil Spill Cleanup", and so-called "endless belt" type devices.

As man's quest for oil becomes more intense, his activities in prospecting and drilling lead into increasingly hostile environments and it has been found necessary to provide oil-pick-up devices which will operate to quickly contain and pick up oil spills so as to minimize ecological damage and commercial losses that might otherwise be sustained, since oil recovered in most instances is industrially usable. By way of background, and to further illustrate the prior art of which applicants are aware, the following patents are cited:

U.S. Pat. No. 3,536,199 (Cornelius) "Fire Extinguishing Oil Slick Separator"
U.S. Pat. No. 3,358,838 (Kosar) "Oil Skimming Device"
U.S. Pat. No. 2,474,018 (Verner) "Oil Skimming Device"
U.S. Pat. No. 3,096,278 (Francom) "Scraper Assembly for Filters"
U.S. Pat. No. 3,338,414 (Lefke) "Liquid Skimming Device"
U.S. Pat. No. 3,614,873 (Cole) "Freezing Oil Spills"
U.S. Pat. No. 3,702,296 (Maksim) "Oil Skimming Device and Method"
U.S. Pat. No. 3,314,540 (Lane) "Removal of Oil Films from Water"

It is apparent to applicants that none of the devices disclosed in the aforementioned patents utilize and describe an effective and efficient means for operating in an ice-clogged environment where part or substantially all of the surface of water contains a mixture of oil and broken oil-covered ice.

DESCRIPTION OF THE INVENTION

As utilized herein the terms "oil" and "water" are utilized representatively to include any type of relatively immiscible fluids at least one of which will display oleophilic characteristics to materials immersed therein. Similarly, the term "ice" is intended to encompass wood, plastic, or other debris to which "oil" may adhere. While many of the aforementioned devices provide, to some degree, a means of separating oil from water, it should be recognized that they provide minimal, if any, capability of removing oil from the surface of ice chunks which are often found floating in an oil/water mixture. For example, a pick-up device of the type described in U.S. Pat. No. 3,576,257, operating alone, would effectively remove most of the oil from water which passes relative to it, but would not effectively remove oil from the surface of pieces of oil passing under it. Accordingly, applicants have provided a means to provide a further "jarring" to the ice pieces while at the same time propelling them back away from the oil pickup means, the ice chunks being then upwardly propelled along the inclined surface of a perforated inclined throughput barrier which allows oil jarred from the ice to rise through the barrier and toward the surface of the water. The oil is contained and, in fact, "built up" in thickness above the throughput barrier as a result of its being contained between the side support members of the structure supporting the pick-up device, the pick-up device itself, and a rear "back stop".

Our invention is highly transportable, including air transportable, on short notice, to the scene of a pollution problem and provides a means preventing oil pollution remaining in an environment where oil covered ice is encountered.

BRIEF DESCRIPTION OF THE DRAWINGS

The invention may be more easily understood from the following description and accompanying drawings in which.

DESCRIPTION

Figure 1:
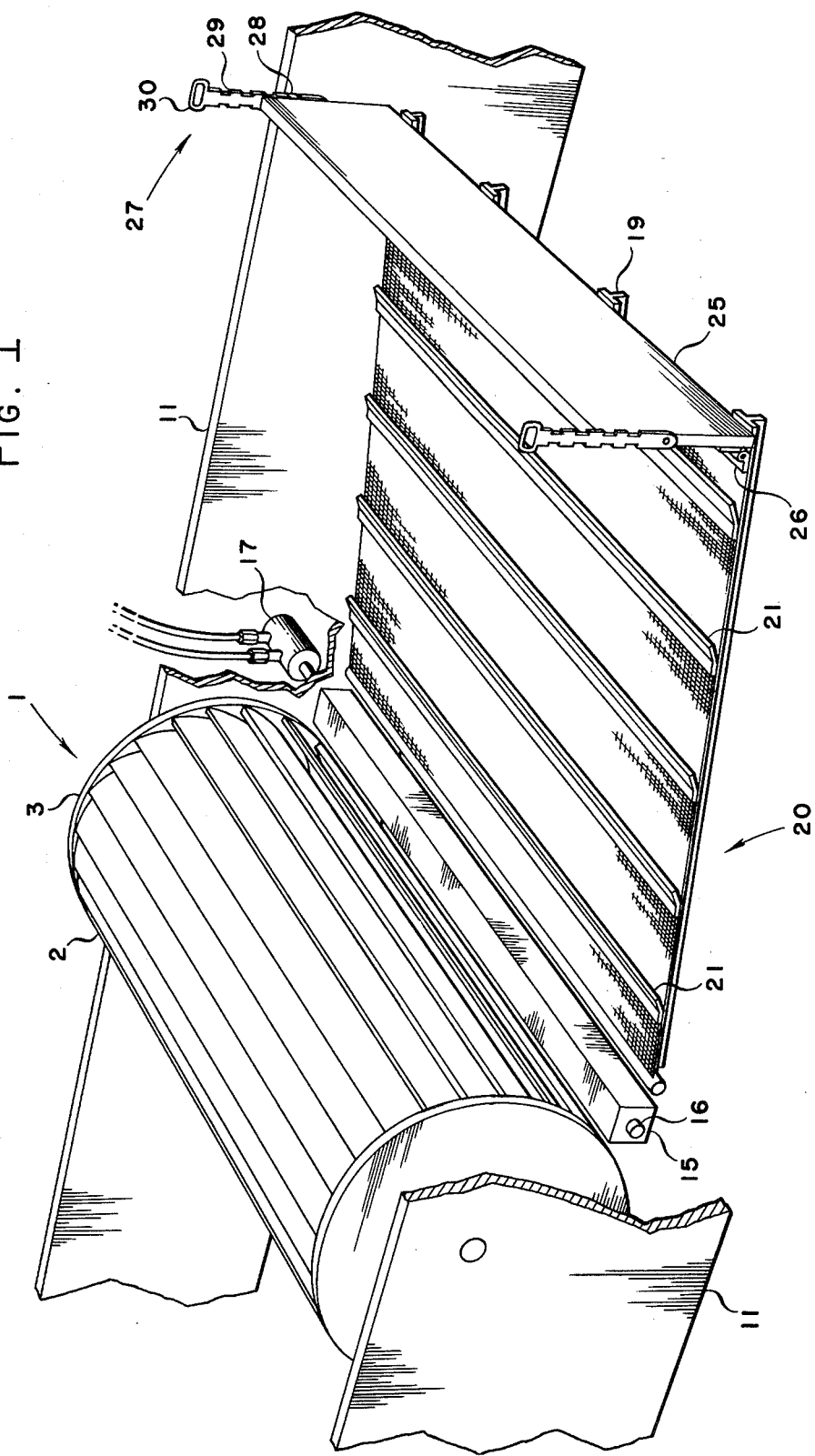
FIG. 1 is a perspective view, partially broken away to show interior structures of an apparatus constructed in accordance with the teachings of the instant invention.

In accordance with the above, the invention is described in detail in combination with the attached drawings. Turning first to FIG. 1, an oil pick-up means 1 is shown to be mounted between two generally parallel side support members 11. It is noted that these side support members may be the sides of a "well" in a boat hull, the sides of pontoons affording a catamaran type structure, or between other channel forming supports with which the pick-up device is adapted to be suspended. While details of the oil pick-up means 1 are not shown, it is understood that they maybe substantially as shown and described in the aforementioned U.S. Pat. No. 3,576,257. Briefly, oil pick-up means 1 comprises a drum formed essentially by parallel and generally horizontal vane members 2 which are slanted toward the interior of the pick-up unit and which peripherally surround a plurality of substantially vertical and parallelly placed discs such as shown at 3 (the interior discs extending through the center portion of the drum) in the manner taught in U.S. Pat. No. 3,576,257, the discs rotate around a hollow trough axle and are provided with wipers which remove oil adhering to the disc surfaces and allow it to drop into the axle trough to be transported to a storage reservoir. Ice chunks generally at 13 in FIG. 2 encounter the oil pick-up means and are, by its rotation and/or the relative flow of water forced beneath pick-up means 1. While a portion of oil adhering to the ice surface is removed by this jarring action, a particularly more severe jarring is provided as ice encounters tumbler bar 15 which rotates in a direction identical to that of oil pick-up means 1. In practice, applicants have found that the rotational speed of the tumbler 15 and the pick-up drum 1 is such that the peripheral velocity of the drum is less than that of the tumbler. This like manner of rotation has a two-fold purpose of preventing ice from being crushed between tumbler bar 15 and drum pick-up means 1 which might damage either or both members, and providing an impetus to the chunks of ice to send them backward and into contact with the inclined under surface of perforated inclined throughput barrier 20.

With further reference to tumbler bar 15, it is noted that this member is preferably square in cross section and may be a simple extrusion or other suitably formed member. Tumbler bar 15 is mounted by and adapted to rotate about an axle 16 which may be journalled in side support members 11. It is preferable to provide power for both pick-up means 1, and tumbler bar 15, the motive force for which may be, for example, a hydraulic motor 17 which allows the speed of rotation of the tumbler bar to be easily varied. While applicants have chosen a square cross-sectional shape tumbler bar, it is understood that it could be of other cross-sectional shapes, for example, rectangular or circular, either of which may be provided with a plurality of continuous, or broken, "fins" or spikes extending essentially radially outwardly from the surface thereof.

Figure 2:
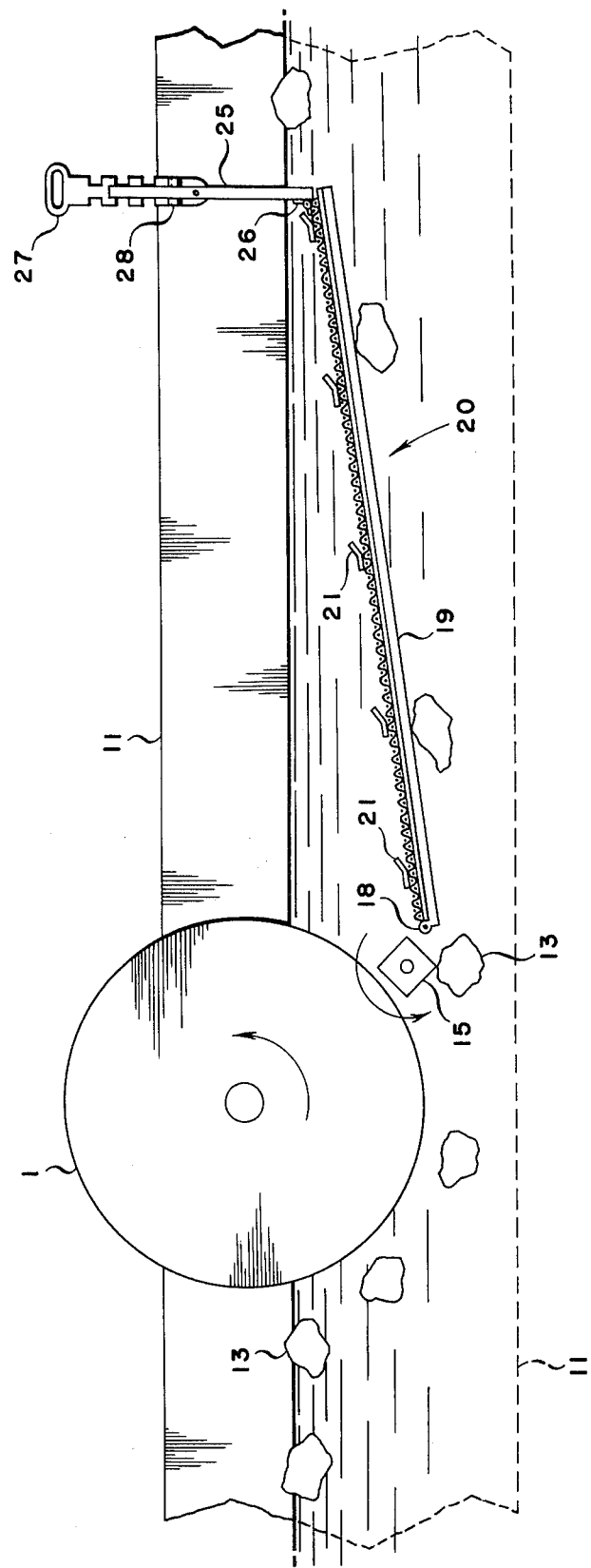
FIG. 2 is a side elevational view of the unit shown in FIG. 1.

A perforated, inclined, throughout barrier 20 is preferably journalled between side support members 11 by a pivot pin 18 as shown in FIG. 2. Preferably, pivot pin 18 is located so that the lower end of throughput barrier 20 is at or above the lowermost portion of tumbler bar 15 as it rotates about axle 16. Throughput barrier 20 is preferably formed of a heavy duty, one-inch mesh, screen which will readily allow oil jarred from the surface of ice to pass therethrough. Desirably, the throughput barrier screen may be strengthened by a plurality of essentially parallel bars 19 which are "T" shaped in cross section and secured to throughput barrier 20 on the flat or cross surface of the "T" by welding or other suitable means. The upper surface of throughput barrier 20 may preferably be strengthened by angle bars 21 which have their lower angle surface secured to throughput barrier 20 in a manner similar to that utilized in securing T bar 19 to throughput barrier 20. The upstanding sides of angle bars 21 are preferably inclined at approximately a 45° angle to the throughput barrier 20 in a manner to provide for a flow of fluid therethrough at a similar angle. It should be understood that throughput barrier 20 as described in this preferred embodiment is a large mesh screen (e.g. of one inch square openings). This barrier may also be formed of expanded metal or of essentially solid material with holes of appropriate size extending therethrough. However, the more perforate the member, the less resistance to the flow of rising oil will be presented. Pieces of ice as they are propelled along the under surface of barrier 20 are continually jarred and rotated thus further enhancing the removal of oil from the surface of the ice. It has been found in tests that the angle of throughput barrier 20 may vary from approximately 0° to approximately 30° above or below the horizontal though this may vary within a broad range and still be within the scope contemplated by the present invention.

Hingedly mounted at the aft end of throughput barrier 20 is a containment backstop 25, which is mounted to barrier 20 by means of, for example, a hinge pin 26. Backstop 25 is preferably essentially vertical, that is perpendicular, to the mean water surface, and is provided with a backstop adjustment means 27 by which backstop 25 may be selectively raised and lowered. Obviously, the raising and lowering of backstop 25 will provide for a changed angle of inclination of throughput barrier 20 in a manner desired to suit the requirements of a given situation taking into consideration relative speed of the device with respect to current, speed of rotation of tumbler and pick-up unit, size of ice pieces, fluid viscosity and the like. In the embodiment shown, adjustment means 27 comprises a clevis-like latch 28 secured to side support members 11 which is adapted to engage and receive the notched strap 29. Suitable hand grips 30 may be provided to accommodate the manual adjustment of the mechanism. Obviously, should it be desirable to do so, other adjustment means may be provided to substitute for the manual means shown, such adjustment means taking the form of cranks, pulleys, worm gear drives, hydraulic cylinders or other mechanisms as will be familiar to one skilled in mechanical arts.

OPERATION

In operation, a relative movement is provided between a surface of fluid which is coated with an oil/ice combination, and oil pick-up means 1. Such movement may be provided by a natural or an artifical impetus to the fluid, and/or by the movement of the pick-up means 1 through the fluid as, for example, by mechanical means in a refinery settling pond, or in a water craft. The oil/ice mixture encountered by pick-up means 1 is processed in such a manner that free oil tends to be accumulated within and picked up by the pick-up device 1, while the oil coated pieces of ice continue under pickup means 1 where they encounter tumbler bar 15 which provides a jarring or "kick". Especially for ice chunks which tend to be other than flat, the rotation of pick-up means 1 would tend to impart a rotation to the pieces of ice as indicated in FIG. 2. Tumbler bar 15 rotates in the same direction as pick-up means 1, and provides an additional "jolt" to ice pieces as they are passed onto throughput barrier 20. While they pass under barrier 20 additional jarring and rotational "scouring" motion is provided which tends to wash the oil from the surface of the oil and allow it, as a result of its inherently lighter specific gravity, to move through the perforations in throughput barrier 20 into the relatively quite "pond" area formed by backstop 25, sidewalls 11, and the pick-up device 1. As oil tends to build up within the pond area, it is increasingly forced into the pick-up means 1 where such buildup enhances its operation. Thus a means has been provided to afford not only a cleaning of oil from the surface of a fluid, but also from pieces of ice (and, inherently, wood and other floating debris) which may be contained on the fluid surface.

In operation, it may be desirable to enhance the pickup of oil in extremely cold environments or where particularly viscous oil is encountered by imparting heat either to the inside of the pickup drum, or to the "ponding" area or both, such heating means, not shown, being well within the skill of one familiar with the art.

We claim:

1. A device for separating oil from water and pieces of floating ice comprising spaced side support members, adapted to extend beneath a water surface, constituting a channel area, rotational oil pickup means journalled between said side supports, a perforate through-put barrier, adapted to be submerged in operation, having an inclined under surface and forward and rearward edges, said forward edge secured between said side supports adjacent said pickup means and positioned to be able to receive submerged pieces of ice against its under surface, a containment backstop hingedly attached to the rearward edge of said barrier and extending between said side supports, thus to form between said pickup device and said side members a containment ponding area for accumulated oil, and a rotatable tumbler bar journalled between said side members and positioned generally between the forward edge of said barrier and the lower periphery of said pickup means.

2. A device for separating oil from water and pieces of floating ice as claimed in claim 1 in which said barrier is pivotly suspended at one end between said side members and including adjustment means attached to said side supports and said backstop for raising and lowering said backstop, thus to adjust the angle of inclination of said barrier.

3. A device for separating oil from water and pieces of floating ice as claimed in claim 1 and which said tumbler bar is generally square in cross section.

4. A device for separating oil from water and pieces of floating ice comprising spaced side support members having their lower surfaces adapted to extend beneath the surface of water on which they may be positioned, the area between said side support members constituting a channel area, a generally drum-like oil pickup means extending between said side supports with the lower portion thereof adapted to be positioned beneath the water line, a rotatable tumbler bar journalled between said side support members and extending next adjacent and generally parallel to the surface of said drum-like pickup means in a lower quadrant thereof, a perforate throughput barrier secured between said side supports and pivotable at one end about an axis generally parallel to and next adjacent the lower surface of said tumbler bar on the side thereof opposite to said drum-like pickup means, a backstop hingedly mounted to the opposite end of said throughput barrier and adapted to extend generally between said side support members, and backstop adjustment means associating said backstop with said side support members for raising and lowering said backstop, thus to adjust the angle of inclination of said throughput barrier about said pivot axis.

5. A device for separating oil from water and pieces of floating ice as claimed in claim 4 and in which said drum-like pickup means comprises a plurality of generally vertical, parallelly disposed discs, the periphery of the drum consisting a plurality of generally horizontally vane members, said drum being adapted to rotate in such a manner that the front vanes move downwardly with respect to an oil/water interface, said tumbler means adapted to rotate in the same direction as said drum-like oil pickup means.

* * * * *